Patented July 27, 1943

2,325,413

UNITED STATES PATENT OFFICE 2,325,413

MASTER SWITCH AND CONTROL SYSTEM COMBINATION

Bruce E. McArthur, East Cleveland, and Asa H. Myles, Solon, Ohio, assignors to The Electric Controller & Manufacturing Company, Cleveland, Ohio, a corporation of Ohio Application September 10, 1942, Serial No. 457,802

11 Claims. (Cl. 172—152)

This invention relates to electric systems of control for alternating current induction motors which are utilized as driving motors for apparatus in which the load at time overhauls the motor and drives it, and in which the overhauling load must be retarded to prevent the overhauling speed from becoming excessive. The invention is particularly applicable to hoist motors which may be overhauled and driven by a descending load and the invention is hereinafter described as applied to that use.

Heretofore, when polyphase wound rotor induction motors have been used to operate electric hoists, descending over-hauling loads have been retarded by connecting the motor to a source of power having preponderantly polyphase characteristics for causing the motor to exert a reduced motor torque which opposes but does not exceed the torque of the load. Since the counter-torque, or reduced motor torque which opposes the torque of the descending load, is obtained by connecting the primary winding of the motor to the source of power in the same manner as for hoisting, the counter-torque operation often has been controlled from the hoisting positions of the master switch. For example, in a copending application of Harry L. Wilcox, Serial No. 408,153, filed August 25, 1941, there is disclosed a control system for a polyphase wound rotor induction motor subject to overhauling loads in which several values of counter-torque and a value of single phase braking torque are selectively available, but in which the counter-torque is available only when the master switch is in a hoisting position. The single phase braking action results from the rotation of a rotor circuit of high resistance through an unsymmetrical field set up due to energization of the primary from a source of power having preponderantly single phase characteristics and the presence of a local closed path of low resistance in the primary circuit. As used herein, single phase source of power refers to a source having preponderantly single phase characteristics and single phase braking refers to braking action obtained by connecting the primary to such a source with a portion of the primary short circuited, i. e. connected in a local circuit of low impedance. Since in the control system of the Wilcox application a load can be lowered by either single phase braking, power or regenerative lowering, or counter-torque lowering, it is confusing to a crane operator to have to move the master switch to what is normally a hoisting position in order to use one of these methods of lowering, whereas the other two methods are available from the usual or natural lowering positions of the master switch. It is desirable that all lowering connections that are provided be available when the master switch is in the usual or natural lowering positions and that when the master switch is in what is normally the hoisting positions, only hoisting connections be available.

Prior control systems which provide only counter-torque lowering and power or regenerative lowering have been arranged, but in such systems the master switch must be moved from a neutral or "off" position through its lowering zone to the end of the lowering zone farthest from the neutral position before the motor is connected to the source of supply. When the master switch is at the end of the lowering zone, the motor is connected to produce lowering or regenerative torque and a circuit is completed which energizes the contact segments between the remote end of the lowering zone and the "off" or neutral position so that upon return toward "off" position of the master switch from the remote end of the lowering zone, the motor is connected for counter-torque operation. Both counter-torque lowering and power or regenerative lowering thus are obtained from the same side or lowering zone of the master switch, but counter-torque lowering is obtained only after the master switch is returned part way from the remote end of the lowering zone.

However, adding single phase braking to a counter-torque control system such as just described, presents several difficulties, for example, the portion or sub-zone of the lowering zone nearest the "off" position is the best for single phase braking operation because of the excellent inching control thereby rendered available, but since the positions between the nearest and farthest positions of the lowering zone are ineffective until after the master switch has been moved to the farthest position, uniform operation in response to master switch movement is not possible because the friction brake must be released when the single phase braking sub-zone is reached and re-applied during the time of movement of the master switch to the farthest position in the lowering zone.

In accordance with this invention a combined single phase braking and counter-torque lowering controller is provided in which the position nearest the "off" position normally is the single phase braking sub-zone and all other positions beyond the single phase sub-zone provide power or regenerative lowering and in which an auxiliary manual means is operable while the master switch is in any of the lowering positions to alter the control connections so that counter-torque lowering is thereafter available throughout the lowering zone; thus in effect changing the lowering zone to a counter-torque zone.

More specifically, when the master switch is in the lowering zone, movement of the auxiliary manual means to one of its two positions causes disconnection of the motor from the source of power supply and application of a magnetically released friction brake which holds the load at a standstill. Movement of the manual means to its second position after movement to its first position and while the master switch is still in the lowering zone reconnects the motor to the source of power so that the motor exerts a counter-torque. Operation of the manual means causes unbalancing of the secondary circuit of the motor so that the hoisting or counter-torque of the motor is reduced below that obtainable when the master switch is in the hoisting positions. Subsequent movement of the manual means between its first and second positions provides additional inching control of the load.

By means of the present invention single phase braking, power or regenerative lowering, and counter-torque lowering all are rendered available while the master switch is in what ordinarily is the lowering zone without increasing the number of lowering positions. The counter-torque is obtained by unbalancing of the secondary resistor so that the tendency to hoist loads by counter-torque is limited. As the master switch is moved away from its neutral position through the lowering zone, the counter-torque diminishes, thereby causing the counter-torque lowering speeds to increase away from neutral in one direction in the same manner as the hoisting speed increases as the master switch is moved away from its neutral position in the other direction through the hoisting positions. Furthermore, once the shift has been made from power lowering to counter-torque connections, the motor connections cannot be changed back to power lowering or single phase braking until the master switch is returned to the neutral position.

It is an object of this invention to provide an improved control system for a wound rotor induction motor subject to overhauling loads.

Another object is to provide a control system for a wound rotor induction motor used for hoisting service which provides a simple and centralized control of counter-torque, single phase braking, and power or regenerative lowering and in which all three are available from the same group of positions of the usual multi-position master switch at the option of the operator.

A further object is to provide a control system for a wound rotor induction motor used for hoisting service in which the operator at will can select either single phase braking, power or regenerative lowering, or counter-torque lowering operations and in which the counter-torque is normally less than the available hoisting torque and is obtained while the master switch is in what is normally the lowering zone.

A further object is to provide a simple hoist control system which is capable of connecting a polyphase wound rotor induction motor for power hoisting when a master switch is on one side of a neutral position and which is capable of connecting the motor selectively for power or regenerative lowering, single phase braking, or counter-torque lowering when the master switch is on the other side of the neutral position.

Another object is to provide an improved control system for a wound rotor induction motor used for hoist service, and having a multi-position master switch which provides power lowering and counter-torque lowering control from a lowering zone which is located wholly to one side of the neutral position with no increase in the required number of lowering positions.

Another object is to provide a counter-torque hoist controller in which inching between de-energization and friction braking and any one of several counter-torque values is accomplished by push button manipulation.

A correlative and more specific object is to provide a control system and master switch combination such that, as the master switch is moved in one direction from one to the other of its extreme positions, it normally starts by providing maximum hoisting speed, gradually decreases the speed to minimum hoisting speed, then in order, passes to "off" condition, to single phase braking, to minimum and then to maximum power lowering acceleration, and in the reverse direction performs said operations in reverse order, and in which by the operation of an auxiliary manual means, the single phase braking and power lowering positions or zones are rendered operative as counter-torque positions in which the counter-torque decreases as the master switch is moved from the "off" position in the direction which normally causes power lowering acceleration to increase.

Other objects and advantages will become apparent from the following specification wherein reference is made to the drawings, in which.

Figure 1:
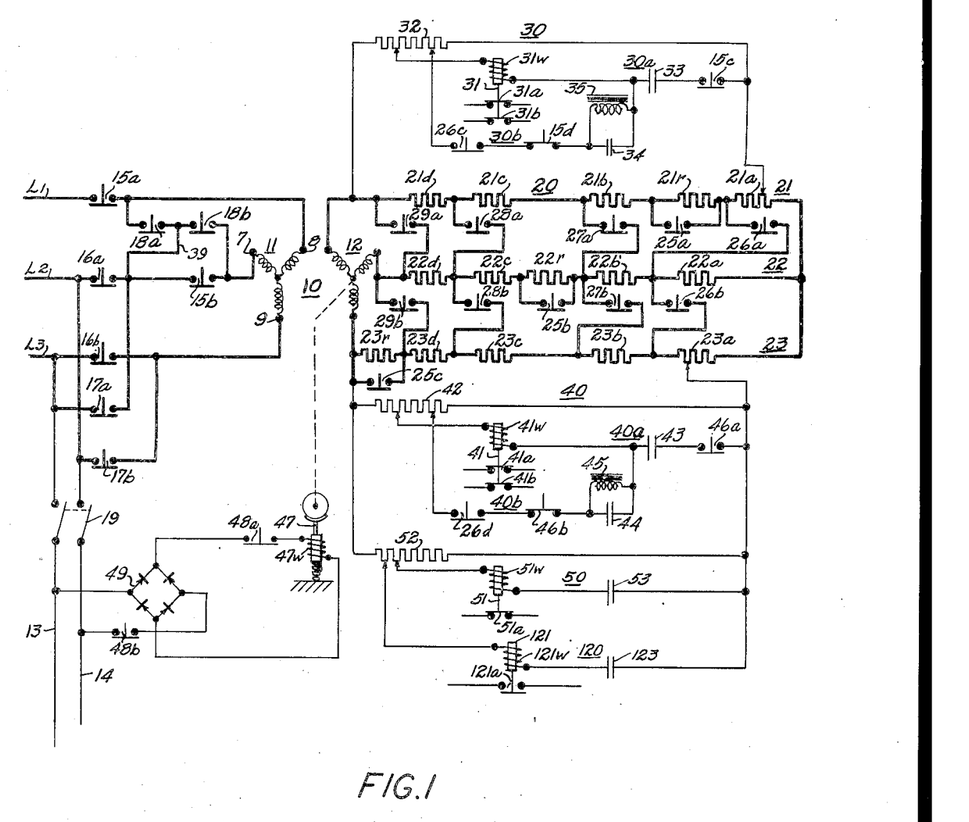
Figure 1 is a complete power circuit and a partial control circuit diagram of a control system embodying the invention.

Referring to Fig. 1, a wound rotor induction motor 10 has its primary winding 11 arranged to be energized from a source of three phase power represented by the conductors L1, L2, and L3. A Y-connected motor is illustrated in the drawings, but the control system herein described can be used with a delta connected motor as well. The primary winding 11 has three terminals 7, 8 and 9. For causing the motor 10 to exert a torque in a direction to assist in lowering a load the terminal 8 is connected to the conductor L1 through contacts 15a, the terminal 7 is connected to the conductor L2 through contacts 15b and 16a, and the terminal 9 is connected to the conductor L3 through contacts 16b. For causing the motor 10 to exert a torque in a direction tending to hoist a load the connections from the terminals 7 and 9 to the conductors L2 and L3 are reversed through contacts 17a and 17b. For single phase braking operation, the terminals 7 and 8 are interconnected through contacts 18a and 18b and a point on the interconnection is connected to the conductor L2 through a conductor 39 and the contacts 16a, and the terminal 9 is connected to the conductor L3 through the contacts 16b.

The motor 10 has a secondary winding 12 connected through slip rings to a polyphase network comprising a Y-connected resistor 20 having each of its three branches 21, 22, and 23 divided into five resistance sections $a$, $b$, $c$, $d$, and $r$ which are referred to by using those letters as subscripts to the reference character of the corresponding branch. Thus the branch 21 comprises the sections 21a, 21b, 21c, 21d, and 21r. The sections 21r, 22r, and 23r are arranged to be short circuited by contacts 25a, 25b, and 25c, respectively. The resistance sections 21a, 22a, and 23a are of equal ohmic value and are arranged to be short circuited by contacts 26a and 26b; the additional resistance sections 21b, 22b and 23b are of equal ohmic value and together with the section 21r are arranged to be short circuited by contacts 27a and 27b; the additional resistance sections 21c, 22c and 23c are of equal ohmic value and together with the section 22r are arranged to be short circuited by contacts 28a and 28b; and the additional resistance sections 21d, 22d and 23d are of equal ohmic value and are arranged to be short circuited by contacts 29a and 29b. The resistance sections 21r, 22r, and 23r preferably are of equal ohmic value, but may be unequal if desired. Preferably, the resistance of the sections 21a, 22a, and 23a is about one-half of the total resistance of the resistor network 20.

Acceleration of the motor 10 may be controlled by the relays 31, 41 and 51 of relay circuits 30, 40 and 50, respectively, which are connected across voltage dividers 32, 42 and 52, respectively. The voltage dividers 42 and 52 are connected in parallel across one of the branches of the secondary resistor 20 shown as the branch 23, one connection being adjustable along the section 23a as shown, and the voltage divider 32 is connected across a different branch of the secondary resistor 20, shown as branch 21, one connection being adjustable along the section 21a as shown. The relay 31 has an operating winding 31w and normally closed contacts 31a and 31b and the relay 41 has an operating winding 41w and normally closed contacts 41a and 41b. The relay 51 has an operating winding 51w and normally closed contacts 51a.

In the relay circuit 30 the relay operating winding 31w, a condenser 33, and normally open contacts 15c are connected in series across an adjustable portion of the voltage divider 32 to form a series resonant circuit 30a. Also connected in series with the winding 31w across an adjustable portion of the voltage divider 32 and forming with the winding 31w a series-parallel resonant circuit 30b are normally open contacts 26c, normally closed contacts 15d, and a parallel circuit including a condenser 34 and a non-saturable reactor 35.

In the relay circuit 40 the relay operating winding 41w, a condenser 43, and normally open contacts 46a are connected in series across an adjustable portion of the voltage divider 42 to form a series resonant circuit 40a. Also connected in series with the winding 41w across an adjustable portion of the voltage divider 42 and forming with the winding 41w a series-parallel resonant circuit 40b are normally open contacts 26d, normally closed contacts 46b, and a parallel circuit including a condenser 44 and a non-saturable reactor 45.

In the relay circuit 50 the relay operating winding 51w and a condenser 53 are connected in series across an adjustable portion of the voltage divider 52 to form a series resonant circuit.

For preventing excessive speeds during counter-torque lowering a series resonant relay circuit 120 is provided. The relay circuit 120 is connected across an adjustable portion of the voltage divider 52, and comprises a series circuit including a condenser 123 and an operating winding 121w of a relay 121 having normally open contacts 121a.

The relay circuits 50 and 120 and the series resonant portions 30a and 40a of the relay circuits 30 and 40 are of the type disclosed and claimed in Patent No. 2,165,491, issued July 11, 1939, to J. D. Leitch, and the series-parallel resonant portions 30b and 40b of the relay circuits 30 and 40 are of the type disclosed and claimed in Patent No. 2,232,257, issued to A. H. Myles on February 18, 1941. As more fully described in these patents, the electrical constants of the capacitances and inductances in the relay circuits 30, 40 and 50 are so chosen in relation to each other and to the magnitude and frequency of the secondary voltage drop to which the relay circuits 30, 40 and 50 are subjected that the relay windings 31w, 41w, and 51w are sufficiently energized at certain predetermined speeds of the motor 10 to maintain their respective associated contacts open, but are not sufficiently energized at certain other speeds of the motor 10 to maintain their respective associated contacts open. The reactances of the winding 121w and the condenser 123 are so chosen that for all safe counter-torque lowering speeds the contacts 121a remain open, but are closed as soon as the counter-torque lowering speed reaches an excessive value.

Figure 2:
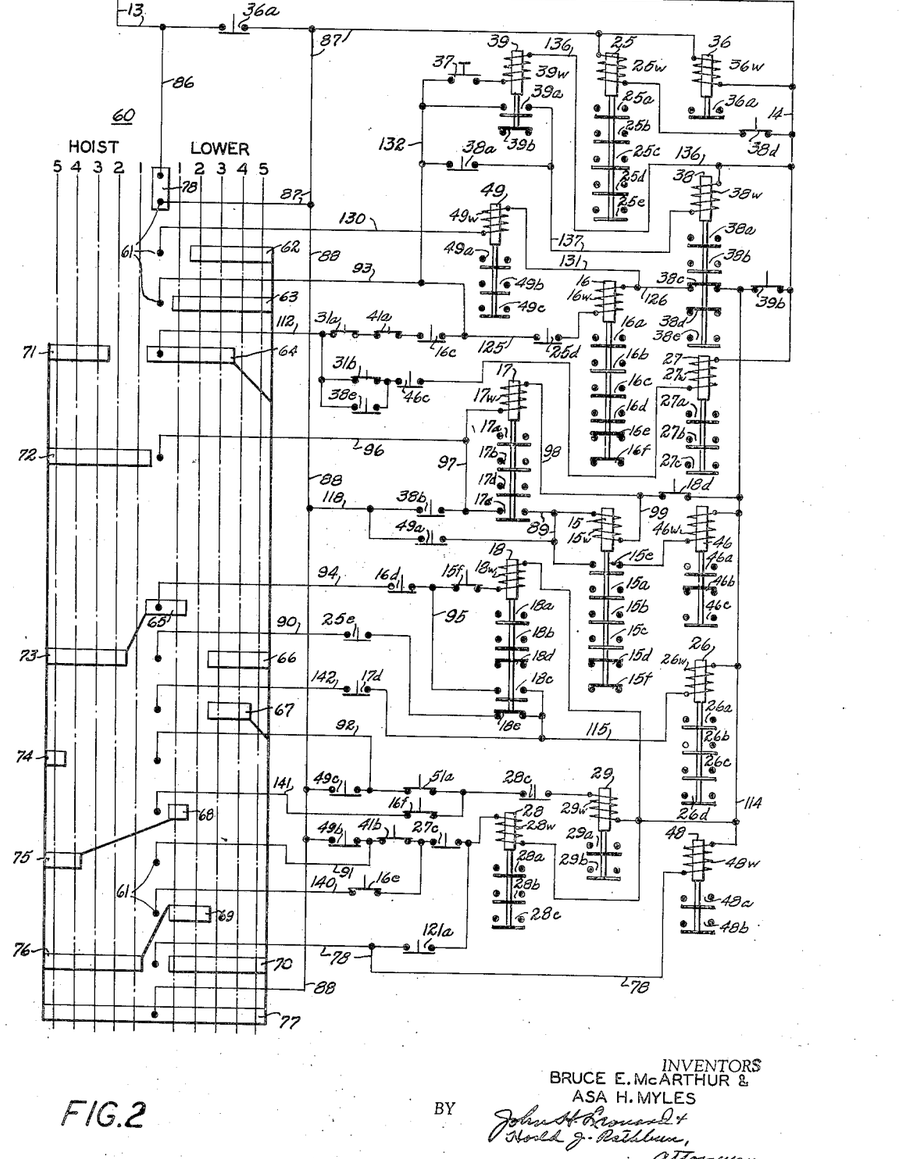
Figure 2 is a diagram of the remainder of the control circuit of Figure 1 and combines therewith to complete the circuit diagram.

The control circuits of Fig. 2 are energized from the conductors L2 and L3 through the conductors 13 and 14 when a knife switch 19, shown in Fig. 1, is closed. A spring applied, electromagnetically released friction brake 47 for the motor 10 has a direct current operating winding 47w connected through normally open contacts 48a to the direct current terminals of a suitable rectifier 49 having its alternating current terminals connected across the conductors 13 and 14 through normally open contacts 48b.

Operating means for all of the contacts shown in Fig. 1 except those of the relays 31, 41, 51, and 121 are shown in Fig. 2. The contacts shown in Fig. 1 and referred to by numerals with distinguishing subscripts, except those of the relays 31, 41, 51 and 121, are parts of the electromagnetic contactors or relays shown completely in Fig. 2. The contacts of the various relays and contactors are also shown at their positions in the circuit as well as in conjunction with the showing of the complete contactor or relay. Each of the complete contactors or relays is referred to by the same reference numeral as its parts but without any subscript. Each of the contactors or relays has an operating winding which is referred to by the reference numeral of its associated contactor or relay and the subscript w.

Referring now to Fig. 2, a low voltage protection relay 36 has an operating winding 36w and normally open contacts 36a. A push button 37 controls, over a circuit to be described, the energization of a pair of relays 38 and 39. The relay 38 has an operating winding 38w, normally open contacts 38a, 38b, and 38e, and normally closed contacts 38c and 38d; and the relay 39 has an operating winding 39w, normally open contacts 39a, and normally closed contacts 39b. A transfer relay 49 having an operating winding 49w and normally open contacts 49a, 49b, and 49c is also provided.

A multi-position master switch 60 having a plurality of circuit terminals 61 movable from an "off" position through five successive lowering positions in a lowering zone and five successive hoisting positions in a hoisting zone is provided for controlling the operation of the various contactors and relays which effect operation of the motor 10. The master switch 60 has lowering contact segments 62–70 inclusive, hoisting contact segments 71–76 inclusive, a contact segment 77 which engages one of the circuit terminals 61 in all positions, and a contact segment 78 which engages two of the circuit terminals 61 only in the "off" position. The contact segments 62–77 inclusive are electrically interconnected. The push button 37 is preferably mounted in the operating handle of the master switch 60 in a well known manner.

As will become apparent from the following description, the lowering zone of the master switch 60 comprises a single phase braking sub-zone and a power lowering sub-zone contiguous to each other and with the single phase braking sub-zone contiguous to the "off" position. The hoisting zone is also contiguous to the "off" position but is on the opposite side thereof from the lowering zone.

A more complete understanding of this invention may be had from a consideration of its operation. Assuming that the switch 19 is closed, if the master switch 60 is in the "off" position, an energizing circuit for the operating winding 36w of the relay 36 is completed from the conductor L3 through the switch 19, the conductor 13, a conductor 86, one of the circuit terminals 61, the contact segment 78, another of the circuit terminals 61, a conductor 87, the winding 36w, the conductor 14, and the knife switch 19 to the conductor L2. As a result of the energization of its operating winding 36w, the relay 36 operates to close its contacts 36a which complete a circuit directly between the conductor 13 and the conductor 87 to maintain the winding 36w energized regardless of the position of the master switch 60. A conductor 88 electrically connects the conductor 87 to the circuit terminal 61 which is in engagement with the contact segment 77 to maintain a connection between the contact segments 62–77, inclusive, and the conductor L3 at all times when the contacts 36a and the switch 19 are closed or when the master switch is in the "off" position and the switch 19 is closed.

Concurrently with the energization of the winding 36w, the operating winding 25w is energized causing the contactor 25 to close its contacts 25a, 25b, and 25c which short circuit the resistance sections 21r, 22r, and 23r, respectively, and to close its contacts 25d and 25e in the circuits to the operating windings 16w and 26w, respectively. The winding 25w is connected in parallel with the winding 36w between the conductor 87 and the conductor 14 through the normally closed contacts 38d. The contacts 38d are closed at all times to maintain the contactor 25 in its energized position except after operation of the push button 37 as described hereinafter.

In all master switch positions except the "off" position the brake operating winding 47w is energized through the contacts 48a and 48b and the brake 47 is released. The energizing circuit for the winding 48w which when energized maintains the contacts 48a and 48b closed is completed in all lowering positions from the segment 70 and in all hoisting positions from the segment 76 through a conductor 78, the winding 48w, a conductor 114, and the normally closed contacts 39b to the conductor 14. As long as the contacts 39b are closed, the conductor 114 remains connected to the conductor L2 of the source through the conductor 14 and the switch 19.

Assuming that a load is to be hoisted by the motor 10, the master switch 60 may be moved to the first position in the hoisting zone to thereby complete an energizing circuit for the winding 17w from the contact segment 72 through a conductor 96, the winding 17w, a conductor 98, and the contacts 18d to the conductor 114. In response to the energization of its operating winding 17w the contactor 17 closes its contacts 17a, 17b, 17c and 17d. Closure of the contacts 17b connects the terminal 9 of the primary winding 11 to the conductor L2, closure of the contacts 17a partially completes a circuit from the terminal 7 of the winding 11 to the conductor L3, closure of the contacts 17c completes an energizing circuit for the winding 15w from the conductor 96 through the conductor 97, the contacts 17c, the winding 15w, conductors 99 and 98, and the contacts 18d to the conductor 114. Closure of the contacts 17d in a circuit to the winding 26w has no operative effect at this time.

In response to the energization of its operating winding 15w, the contactor 15 operates to close its contacts 15a, 15b, 15c, and 15e and to open its contacts 15d and 15f. Closure of the contacts 15a connects the terminal 8 of the primary winding 11 to the conductor L1, and closure of the contacts 15b completes the connection of the terminal 7 to the conductor L3. Closure of the contacts 15c completes the series resonant relay circuit 30a. Opening of the contacts 15d insures that the series-parallel relay circuit 30b is interrupted during hoisting and opening of the contacts 15f interrupts an interlock circuit with the winding 18w. Closure of the contacts 15e completes an energizing circuit for the operating winding 46w of the relay 46 from the conductor 97 through the contacts 17c, a conductor 89, the contacts 15e, and the winding 46w to the conductor 114.

As a result of the energization of its operating winding 46w, the relay 46 closes its contacts 46a to complete the series resonant circuit 40a, opens its contacts 46b to insure that the series-parallel resonant circuit 40b is interrupted during hoisting, and closes its contacts 46c to partially complete an energizing circuit for the operating winding 27w of the contactor 27.

When the master switch 60 is in the first hoisting position, the contactors 15 and 17 are in their energized positions and the motor 10 is so connected to the source as to tend to accelerate a load upward. All of the sections of the resistor 20 except the r sections are connected in the secondary circuit so that the torque of the motor 10 is comparatively low. When the primary winding 11 is first connected to the source, the induced current in the secondary winding 12 is of a comparatively high magnitude and frequency so that the voltage drop across the branches 21 and 23 of the resistor 20 causes energization of the windings 31w, 41w, and 51w of the relays 31, 41, and 51. The relays 31, 41, and 51 are therefore in their energized positions and the contacts 31a, 31b, 41a, 41b, and 51a are open.

Movement of the master switch 60 to the second position in the hoisting zone causes energization of the winding 26w over a circuit from the contact segment 73 through a conductor 90, the contacts 25e and 18e, a conductor 115, and the winding 26w to the conductor 114. As a result of the energization of its operating winding 26w, the contactor 26 closes its contacts 26a and 26b to short circuit the resistance sections 21a, 22a, and 23a, closes its contacts 26c in the series-parallel resonant relay circuit 30b, and closes its contacts 26d in the series-parallel resonant relay circuit 40b. Closure of the contacts 26c and 26d has no effect at this time since the contacts 15d and 46b are open. By short circuiting the resistance sections 21a, 22a, and 23a, the operation of the contactor 26 to its energized position increases the hoisting torque of the motor 10.

When the frequency of the secondary voltage decreases to a value corresponding to approximately 40% of the synchronous speed of the motor 10, the impedance of the series resonant circuit 30a has so increased that the energization of the winding 31w has decreased sufficiently to permit the contacts 31a and 31b to reclose. Closure of the contacts 31a has no operative effect at this time.

If the master switch 60 is now moved to the third position in the hoisting zone, or if it is already in that position, an energizing circuit for the winding 27w is completed from the segment 71 through a conductor 112, the contacts 31b and 46c, and the winding 27w to the conductor 14. As a result of the energization of its operating winding 27w, the contactor 27 closes its contacts 27a and 27b to short circuit the additional resistance sections 21b, 22b, and 23b and closes its contacts 27c to partially complete an energizing circuit for the winding 28w of the contactor 28. Short circuiting of the resistance sections 21b, 22b, and 23b causes a further increase in the torque of the motor 10.

Acceleration of the motor 10 to a speed equal to approximately 70% of its synchronous speed causes a decrease in the energization of the winding 41w of the relay 41 as a result of an increase in the impedance of the series resonant circuit 40a due to the reduction in the frequency and magnitude of the secondary voltage. The decrease in the energization of the winding 41w permits the contacts 41a and 41b to reclose. Closure of the contacts 41a has no operative effect at this time.

If the master switch 60 is now moved to the fourth position in the hoisting zone, or if it is already in the fourth position, an energizing circuit for the winding 28w is completed from the contact segment 75, through a conductor 91, the contacts 41b and 27c, and the winding 28w to the conductor 114. As a result of the energization of its operating winding 28w, the contactor 28 closes its contacts 28a and 28b to short circuit the additional resistance sections 21c, 22c and 23c and closes its contacts 28c to partially complete an energizing circuit for the winding 29w. The hoisting torque of the motor 10 is again increased.

When the speed of the motor 10 reaches approximately 85% of synchronous speed, the secondary voltage and frequency are such as to cause a decrease in the energization of the winding 51w of the relay 51 which permits the contacts 51a to reclose.

If the master switch 60 is now moved to the fifth position in the hoisting zone, or if it is already in that position, an energizing circuit for the winding 29w is completed from the contact segment 74 through a conductor 92, the contacts 51a and 28c, and the winding 29w to the conductor 114. As a result of the energization of its operating winding 29w, the contactor 29 closes its contacts 29a and 29b to short circuit the additional resistance sections 21d, 22d, and 23d. The hoisting torque of the motor 10 is again increased. All of the secondary resistance 20 is now short circuited and the motor 10 accelerates to its normal running speed, its actual speed depending upon the size of the load being hoisted.

Returning the master switch 60 to the "off" position causes reinsertion of the resistance sections d, c, b, and a in the order named, and consequent slow down and stoppage of the motor 10. At the "off" position, the winding 48w of the relay 48 is de-energized and the contacts 48a and 48b open to cause de-energization of the brake winding 47w and consequent application of the brake 47 which assists in bringing the load to a standstill and holds it in its hoisted position.

If the master switch 60 is moved from the "off" position to the first position in the lowering zone, the brake 47 is released as hereinbefore described and the operating windings 16w, 18w and 26w are energized in succession in the order named. The energizing circuit for the winding 16w is from the contact segment 63 through conductors 93 and 125, the contacts 25d, the winding 16w, a conductor 126, and the contacts 38c to the conductor 114. The energizing circuit for the winding 18w is from the contact segment 65 through a conductor 94, the contacts 16d and 15f, and the winding 18w to the conductor 114. The energizing circuit for the winding 26w is from the conductor 94 through the contacts 16d, a conductor 95, the contacts 18c, the conductor 115, and the winding 26w to the conductor 114.

The contactors 16 and 18 operate in response to the energization of their operating windings 16w and 18w to close their contacts 16a, 16b, 18a, and 18b which connect the primary winding 11 for single phase braking. The terminals 7 and 8 of the primary winding 11 are interconnected by the contacts 18a and 18b and a point on the interconnection is connected to the conductor L2 through the conductor 39 and the contacts 16a. The terminal 9 of the primary winding 11 is connected to the conductor L3 through the contacts 16b. Operation of the contactor 16 to its energized position also closes the contacts 16c which complete a holding circuit for the winding 16w which becomes effective when the master switch 60 is returned to the "off" position as hereinafter described, closes the contacts 16d in the circuit of the windings 18w and 26w, and opens its contacts 16e and 16f in energizing circuits for the windings 28w and 29w, respectively. Operation of the contactor 18 to its energized position also closes its contacts 18c in the circuit of the winding 26w and opens the contacts 18e and 18d which serve as interlocks with the contactor 26 and the contactors 15 and 17, respectively.

The contactor 26 operates in response to energization of its operating winding 26w to close its contacts 26a and 26b which short circuit the resistance sections 21a, 22a, and 23a. The secondary circuit of the motor now includes a predetermined amount of the resistance 20. The operation of the contactor 26 to its energized position also causes closure of the contacts 26c and 26d in the relay circuits 30 and 40, respectively, completing the series-parallel resonant circuits 30b and 40b, respectively. The conditions of operation of the relays 31 and 41 are of no consequence while the master switch is in the first lowering position and the effect of the series-parallel connection is described in detail hereinafter in connection with the return of the master switch 60 to the "off" position.

A portion of the primary winding 11 is now short circuited and a portion is energized by a single phase current from the conductors L2 and L3. With the resistance sections b, c, and d now in the secondary circuit, the braking torque of the motor 10 is a maximum for all speeds both above and below synchronism. This type of braking connection is claimed and more fully described in Wilcox Patent No. 2,233,501, issued March 4, 1941. While the single phase braking connections are completed, no downward motor torque is produced so that small loads are not forced downward, and, if an overhauling load is on the hoist, the motor exerts a braking torque.

A small amount of downward motor torque is obtained upon movement of the master switch 60 to the second position in the lowering zone. The windings 18w and 26w are de-energized upon movement of the master switch 60 to the second lowering position by interruption of the circuit between the contact segment 65 and the conductor 94 and the contactors 18 and 26 return to their de-energized positions. Opening of the contacts 18a and 18b removes the short circuit from the primary winding 11 and opening of the contacts 26a and 26b removes the short circuit from the resistance sections 21a, 22a, and 23a. The winding 16w is maintained energized and the windings 15w, 46w and 49w are energized to cause operation of the contactor 15 and the relays 46 and 49, respectively. The energizing circuit for the winding 49w is from the segment 62 through a conductor 130, the winding 49w, and a conductor 131 to the conductor 126. The energizing circuit for the winding 15w is from the conductor 88 through a conductor 118, the contacts 49a, the conductor 89, the winding 15w, the conductors 99 and 98, and the contacts 18d to the conductor 114. The energizing circuit for the winding 46w is from the conductor 89 through the contacts 15e and the winding 46w to the conductor 114. Energization of the winding 15w causes the contactor 15 to close its contacts 15a and 15b so that the primary winding 11 is now connected to the conductor L1 through the contacts 15a, to the conductor L2 through the contacts 15b and 16a, and to the conductor L3, through the contacts 16b, thus causing the motor 10 to exert a downward torque.

The contacts 26c and 26d also open in the second lowering position to interrupt the series-parallel resonant circuits 30b and 40b, respectively. Operation of the contactor 15 to its energized position also causes the opening of its contacts 15d to interrupt the series-parallel resonant circuit 30b, closure of its contacts 15c which complete the series resonant circuit 30a, closure of its contacts 15e, and opening of its contacts 15f in the circuit of the winding 18w. Operation of the relay 49 to its energized position causes closure of the contacts 49a in the circuit of the winding 15w as just described and also causes closure of the contacts 49b and 49c in the circuits of the windings 28w and 29w, respectively. Operation of the relay 46 in response to the energization of its winding 46w causes closure of the contacts 46a to complete the series resonant circuit 40a, opening of its contacts 46b to interrupt the series-parallel resonant circuit 40b, and closure of its contacts 46c to partially complete a circuit to the winding 27w. If the motor 10 is at standstill or rotating at a speed less than 40% of synchronism, the relay windings 31w, 41w, and 51w are each energized by the secondary voltage drop as during hoisting operations and the contacts 31a, 31b, 41a, 41b, and 51a are open.

With the master switch 60 in the second lowering position, acceleration of the motor 10 to 40% of its synchronous speed causes reduced energization of the winding 31w of the relay 31 and consequent reclosure of the contacts 31a and 31b. Closure of the contacts 31a has no effect at this time, but closure of the contacts 31b results in energization of the operating winding 27w and consequent operation of the contactor 27. The energizing circuit for the winding 27w is from the segment 64 through the conductor 112, the contacts 31b and 46c, and the winding 27w to the conductor 14. Operation of the contactor 27 to its energized position causes closure of its contacts 27a and 27b to short circuit the resistance sections a and b in each of the three branches of the resistance 20.

Closure of the contacts 27c due to energization of the winding 27w partially completes an energizing circuit for the operating winding 28w of the contactor 28. When the speed of the motor 10 increases to 70% of its synchronous speed, the winding 41w is practically de-energized and the contacts 41a and 41b reclose. Closure of the contacts 41a has no effect at this time, but closure of the contacts 41b completes an energizing circuit for the winding 28w over a circuit from the conductor 88 through the contacts 49b, 41b, and 27c and the winding 28w to the conductor 114. The contactor 28 in response to the energization of its winding 28w closes its contacts 28a and 28b to short circuit all of the resistance sections except sections 21d, 22d, and 23d causing the lowering torque of the motor to increase. The contacts 28c also close and partially complete a circuit to the winding 29w.

When the motor 10 has accelerated to approximately 85% of its synchronous speed, the energization of the winding 51w is reduced and the contacts 51a close to complete an energizing circuit for the winding 29w from the conductor 88 through the contacts 49c, 51a, and 28c and the winding 29w to the conductor 114. The contactor 29 in response to the energization of its winding 29w closes its contacts 29a and 29b to short circuit the remainder of the resistance 20. The motor 10 now operates at speeds slightly below synchronous speed if the load is not overhauling and at speeds slightly above synchronous speed if the load is overhauling.

Movement of the master switch 60 to the third position in the lowering zone completes a circuit from the segment 66 through the conductor 90, the contacts 25e and 18e, the conductor 115, and the winding 26w to the conductor 114. If the motor 10 has accelerated so that the contacts 31b of the relay 31 are closed, the closure of the contactor 26 has no effect upon motor operation. If the motor has not had an opportunity to accelerate to 40% speed, however, closure of the contacts 26a and 26b of the contactor 26 short circuits resistance sections 21a, 22a, and 23a of the resistor 20 to increase the torque of the motor 10.

When the master switch is moved from the first lowering position to the second lowering position, all of the resistance 20 is in the secondary circuit until approximately 40% speed is reached. The motor thus exerts at first a small downward torque. If the master switch is moved quickly from the "off" position to the third or subsequent lowering positions a higher lowering torque is immediately available due to the fact that the contacts 26a and 26b close without time delay. The relays 31, 41 and 51 are responsive in the third and subsequent lowering positions in the same manner as in the second position lowering to effect sequential energization of the windings 27w, 28w, and 29w and consequent operation of the contactors 27, 28, and 29 to their energized positions. Movement of the master switch 60 from the third to the fourth or fifth positions in the lowering zone does not effect further change in the motor connections during power or regenerative lowering.

Movement of the master switch 60 back to the

"off" position from any position in the lowering zone causes the motor torque to be discontinued and the brake 47 to be applied. When the master switch moves from the second position through the first lowering position, it is obvious that the operating winding 16w remains energized and that the operating windings 18w and 26w are again energized as described hereinbefore to set up single phase braking connections and cause retardation of the motor 10. Movement from the first lowering position to the "off" position does not effect de-energization of the windings 16w, 18w, and 26w at once. The contactor 16 remains in its energized position by virtue of an energizing circuit for its winding 16w from the segment 64 through the conductor 112, the contacts 31a, 41a, and 16c, the conductor 125, the contacts 25d, and the winding 16w to the conductor 126. The contactor 18 remains in its energized position by virtue of an energizing circuit for its winding 18w from the segment 65, through the conductor 94, the contacts 16d and 15f, and the winding 18w to the conductor 114. The contactor 26 remains in its energized position by virtue of an energizing circuit for its winding 26w from the conductor 94 through the contacts 16d, the conductor 95, the contacts 18c, the conductor 115, and the winding 26w to the conductor 114.

The contacts 15c and 46a open, and the contacts 26c, 26d, 15d, and 46b close upon energization of the winding 26w and de-energization of the windings 15w and 46w as the master switch 60 moves from the second lowering position to the "off" position, and consequently the series resonant circuits 30a and 40a are interrupted and the series-parallel resonant circuits 30b and 40b are completed. It is to be noted that since the winding 26w is not energized until the contactor 18 is in its energized position, all transients in the secondary circuit have subsided before the contacts 26c and 26d close.

During single phase braking there are two distinct currents in each branch of the secondary circuit of the motor 10. Assuming a 60 cycle source of supply, one of these currents is a positive sequence current that varies in frequency from zero cycles per second at synchronous speed in one direction of rotation to 60 cycles per second at standstill and to 120 cycles per second at synchronous speed in the opposite direction of rotation. The other current is a negative sequence current that varies from 120 cycles per second at synchronous speed in the direction causing the positive sequence current to be at zero frequency to 60 cycles per second at standstill and to zero cycles per second at synchronous speed in the opposite direction of rotation, that is, at synchronous speeds, one of the two sequence currents has a frequency of 120 cycles per second, whereas the other one has a frequency of zero cycles per second and at zero speed the frequency of the currents is equal and is 60 cycles per second.

The series-parallel resonant circuits 30b and 40b are set to cause operative energization of the windings 31w and 41w when the frequency of the voltage across the voltage dividers 32 and 42 approaches the frequency of the source, or 60 cycles per second if a 60 cycle source is assumed. As the motor approaches zero speed, both the positive sequence currents and the negative sequence current are approaching 60 cycles per second, and therefore both currents affect the relay circuits 30b and 40b in a similar manner.

The windings 31w and 41w remain de-energized during single phase braking as long as the motor 10 is rotating above a predetermined minimum speed. The frequency-current curves of the series-parallel resonant circuits 30b and 40b are peaked at 60 cycles and are at a low current value at all frequencies substantially above and below 60 cycles per second. As the motor 10 is decelerated due to single phase braking torque, the current through one or the other or both of the windings 31w and 41w increases rapidly at a predetermined value of motor speed close to zero speed and causes operation of either or both of the relays 31 and 41 to their energized positions. The contacts 31a or 41a, or both, thereupon open to interrupt the circuit to the operating winding 16w of the contactor 16. De-energization of the winding 16w causes the contactor 16 to open its contacts 16d which interrupts the circuits to the windings 18w and 26w and the contactors 18 and 26 thereupon open their contacts 18a and 18b and 26a and 26b which together with the opening of the contacts 16a and 16b removes the single phase braking connections. The motor 10 is now rotating at a slow enough speed to permit the holding brake 47 to bring it to standstill. When the master switch 60 is moved to the "off" position from the lowering positions, both single phase braking and friction braking are in effect since the relay 48 is de-energized and the contacts 48a and 48b are open to cause de-energization of the operating winding 47w of the brake 47 as soon as the "off" position is reached. The motor 10 is thus quickly brought to a standstill and the single phase connections are automatically removed to prevent a continuous flow of current through the short circuited portion of the primary winding 11.

It is to be noted that the relay circuit 30 is connected for energization from the branch 21 of the secondary resistor 20 whereas the relay circuit 40 is connected for energization from the branch 23. This is because at or near standstill, when the operation of the relays 31 and 41 is to be effected, the secondary current is unevenly distributed among the three branches of the secondary circuit. In one position of the secondary winding 12 with respect to the primary winding 11, the current in two of the branches might be at a maximum value while the current in the third branch might be at a minimum value which is close to zero. In another position of the secondary with respect to the primary, the currents in two of the branches might be approximately 85% of their normal value and the current in the third branch one-half of its normal value. However, one of the branches 21 or 23, at all times during single phase braking, has a current in excess of one-half of the normal value although the other of the branches 21 or 23 might at the same time have a current value of nearly zero. By using both relay circuits 30b and 40b during single phase braking and connecting the contacts 31a and 41a in series with the winding 16w, it is always possible to have a sufficient voltage drop across either branch 21 or 23 for one or the other of the windings 31w and 41w to be energized to effect operation of the contactor 16 to its de-energized position.

If it is desired to lower a load by countertorque control, the push button 37 may be closed and the master switch 60 moved to or remain in any one of the positions in the lowering zone.

With the push button 37 closed and the master switch 60 in the lowering zone, a circuit is completed from the contact segment 63 through the conductors 93 and 132, the push button 37, the operating winding 39w of the relay 39, and a conductor 136 to the conductor 14. The relay 39 in response to the energization of its winding 39w closes its contacts 39a and opens its contacts 39b. Opening of the contacts 39b disconnects the conductor 114 from the conductor 14, and closure of the contacts 39a completes a circuit from the conductor 132 through the conductor 137 and the operating winding 38w of the relay 38 to the conductor 14. The relay 38 in response to the energization of its winding 38w closes its contacts 38a, 38b and 38e and opens its contacts 38c and 38d. While the push button 37 is held closed, the contacts 38c and 38b are both open and all of the directional, dynamic braking, and accelerating contactors are de-energized and the brake contactor 48 is de-energized to cause application of the brake 47. Consequently closure of the push button 37 while the master switch 60 is in the lowering zone causes complete de-energization of the motor 10 and application of the brake 47 to cause the load to remain at standstill.

Opening of the contacts 38d interrupts the circuit through the operating winding 25w of the contactor 25. De-energization of the winding 25w causes opening of the contacts 25a, 25b, 25c, 25d and 25e. Opening of the contacts 25a, 25b and 25c removes the short circuit from the resistance section 21r, 22r and 23r, opening of the contacts 25d interrupts all possible energizing circuits for the winding 16w of the contactor 16, and opening of the contacts 25e prevents energization of the winding 26w from the segment 66. Closure of the contacts 38b partially completes a circuit to the winding 17w and closure of the contacts 38e partially completes a circuit to the winding 27w.

Closure of the contacts 38a completes a holding circuit for the winding 38w from the conductor 132 to the conductor 137 which is independent of the contacts 39a. Re-opening of the push button 37 consequently de-energizes the winding 39w but does not de-energize the winding 38w. Reclosure of the contacts 39b as a result of the de-energization of the winding 39w reconnects the conductor 114 to the conductor 14 and causes energization of some or all of the accelerating contactors depending upon the position of the master switch 60 in the lowering zone. However, since the contacts 38c remain open after re-opening of the push button 37, the relay 49 and the contactor 16 cannot be energized. Closure of the contacts 39b while the contacts 38b are closed causes energization of the winding 17w of the contactor 17 over a circuit from the conductor 88 through the conductor 118, the contacts 38b, the conductors 97 and 96, the winding 17w, the conductor 98, and the contacts 18d to the conductor 114. Closure of the contacts 17c as a result of the energization of the winding 17w completes an energizing circuit for the winding 15w of the contactor 15 by interconnecting the conductors 97 and 89. Closure of the contacts 15e as a result of the energization of the winding 15w completes an energizing circuit for the winding 46w of the relay 46 by interconnecting the conductor 89 and the winding 46w.

Closure of the contacts 17a, 17b, 15a and 15b connects the primary winding 11 of the motor 10 to the source of power so that it exerts a hoisting torque. The hoisting torque is greatly reduced however from that available when the master switch is in the hoisting positions due to the fact that the resistance sections 21r, 22r and 23r are no longer short circuited, but are effective in the secondary resistor 20. Thus the closing and opening of the push button 37 while the master switch 60 is in the lowering zone renders the lowering zone a counter-torque zone.

It is thus seen that if the push button 37 is closed at any time while the master switch 60 is in any of the positions in the lowering zone, the motor 10 is disconnected from the source of supply and the brake 47 is applied. If the push-button 37 is re-opened while the master switch 60 remains in any of the lowering positions, the motor 10 is connected to the source of supply so as to exert a hoisting torque and the brake 47 is released. The push button 37 may be closed and opened quickly so that the transfer from lowering connections to hoisting connections occurs before the brake 47 has time to operate. After the push button 37 has been closed and opened while the master switch 60 is in any of the lowering positions, the master switch 60 may be moved to any other of the lowering positions to obtain speed control in the lowering of overhauling loads. The farther that the master switch 60 is moved from the "off" position the less the counter-torque and the greater the lowering speeds.

When the master switch 60 is in the first lowering position and the push button 37 has been closed and opened the contactors 27, 28 and 29 are in their energized positions and all of the resistor 20 is short-circuited except the section 23r. The secondary circuit is therefore unbalanced and the motor 10 exerts a hoisting torque which permits overhauling loads to be lowered at a slow speed. The circuit to the winding 27w is from the conductor 112 through the contacts 38e and 46c. The circuit to the winding 28w is from the segment 69 through a conductor 140 and the contacts 16e and 27c. The circuit to the winding 29w is from the segment 68 through a conductor 141 and the contacts 16f and 28c.

The counter-torque is decreased and the lowering speed increased upon movement of the master switch 60 from the first to the second lowering position due to de-energization of the winding 29w by interruption of the circuit between the segment 68 and the conductor 141. De-energization of the winding 29w permits the contacts 29a and 29b to open, removing the short circuit from the resistor sections 21d, 22d, and 23d. The resistor 20 remains unbalanced due to the inclusion of the section 23r in the branch 23.

A further decrease in counter-torque and consequent increase in the lowering speed of overhauling loads is obtained upon movement of the master switch 60 from the second to the third lowering postion. In the third lowering position, the energizing circuit for he winding 28w is interrupted between the segment 69 and the conductor 140 and the contacts 28a and 28b open to remove the short circuit from the sections 21c, 22c, 23c and 22r. The resistor 20 remains unbalanced because of the inclusion of the sections 22r and 23r in the branches 22 and 23, respectively.

When the master switch moves from the second to the third lowering position the winding 26w is energized over a circuit from the segment 67, a conductor 142, the contacts 17d and the conductor 115. The contactor 26 in response to the energization of its winding 26w closes its contacts 26a and 26b to short circuit the sections 21a, 22a and 23a. While the master switch 60 is in the third position closure of the contactor 26 has no operating effect since the contacts 27a and 27b are closed.

In the fourth lowering position the circuit to the winding 27w is interrupted between the segment 64 and the conductor 112 which permits the contacts 27a and 27b to open, removing the short circuit from the resistor sections 21b, 22b, 23b, and 21r. The resistor 20 is now balanced but since the r sections are included with the d, c, and b sections, the motor 10 does not exert an extremely high hoisting torque, but a torque sufficient to permit heavy overhauling loads to be lowered quite rapidly.

Upon movement of the master switch 60 from the fourth to fifth lowering position, the circuit to the winding 26w is interrupted between the segment 67 and the conductor 142 so that the contacts 26a and 26b open to insert all of the resistor 20 into the secondary circuit of the motor 10. The counter-torque of the motor 10 under these conditions is extremely weak and overhauling loads are lowered at a rapid rate.

The relay circuit 120 is adjusted so that the winding 121w becomes energized sufficiently to close the contacts 121a when the frequency of the current in the secondary winding 12, assuming a 60 cycle source, is approximately 130 cycles. A secondary frequency of 130 cycles is obtained when an overhauling load is driving the motor 10 at approximately 115% of synchronous speed in the opposite direction from that of the rotation of the magnetic field set up by the primary winding 11. Closure of the contacts 121a completes an energizing circuit to the winding 28w from the conductor 70, thus when the master switch is in the fourth or fifth lowering position and the motor speed, due to counter-torque lowering, exceeds 115% of synchronous speed, the contactor 28 closes the contacts 28a and 28b to short circuit the a, b, and c sections and the sections 21r and 22r of the resistor 20, which slows down the motor 10 and causes it to run at the speed it would have if the master switch 60 were in the second lowering position.

During counter-torque lowering the frequency of the secondary current of the motor 10 is above that of the source and consequently the relays 31, 41, 40, and 51 remain in their deenergized positions.

We claim:

1. In a braking control system for a wound rotor induction hoist motor, the combination comprising a hoist motor, a movable controller, said controller being provided with an "off" position, a zone for single-phase braking contiguous to said "off" position, a zone for graduated degrees of power lowering contiguous to said single phase braking zone with the position nearest the single phase braking zone permitting the least rapid power lowering acceleration, a zone for graduated degrees of hoisting torque contiguous to said "off" position and on the opposite side thereof from the single phase braking zone with the position of weakest hoisting torque nearest said "off" position, and means operable in cooperation with said controller to connect said motor for exerting a hoisting torque less than said weakest hoisting torque when the controller is in other than the "off" position and hoisting zone.

2. In a braking control system for a wound rotor induction hoist motor, the combination comprising a hoist motor, a movable controller, said controller being provided with an "off" position and a lowering zone which comprises both a sub-zone for single-phase braking contiguous to said "off" position and a sub-zone for graduated degrees of power lowering contiguous to said single phase braking sub-zone with the position nearest the single phase braking sub-zone permitting the least rapid power lowering acceleration of the motor, a manual switch means operative only while said controller is in said lowering zone, and means responsive to operation of said manual switch means to render said lowering zone operative as a counter-torque zone with the position of greatest counter-torque nearest said "off" position.

3. The combination with a control system for a polyphase wound rotor induction motor subject to overhauling loads and having a primary winding and a secondary winding and comprising a polyphase resistance network adapted to be connected to said secondary winding to form, when so connected, a closed polyphase network with said secondary winding, forward means operable to connect said primary winding to a source of polyphase power for causing said motor to exert a torque assisting the torque of the overhauling load, reverse means operable to connect said primary winding to a source of polyphase power for causing said motor to exert a torque opposing the torque of the overhauling load, braking means operable to connect a portion of said primary winding to a source of single phase power and to short circuit a portion of said primary winding, a multi-position master switch movable to different positions for causing operation of said forward means, reverse means, and braking means, respectively, of means operable, while said master switch is in the position normally causing operation of said forward means, to cause operation of said reverse means instead of operation of said forward means.

4. In a braking control system for a wound rotor induction motor, a movable controller including a plurality of switching devices, said controller being provided with an "off" position, a single phase braking zone contiguous to said "off" position, and a power lowering zone contiguous to said single phase braking zone, some of said switching devices being operable when the controller is in said single phase braking zone to connect said motor for single phase braking, some of said switching devices being operable when the controller is in said power lowering zone to connect said motor for power lowering with the acceleration due to power lowering being least when said controller is moved to a position in said power lowering zone closest to said single phase braking zone, means operable while said controller is in said power lowering zone to render some of said switching devices inoperative and other of said switching devices operative to render said single phase braking zone and said power lowering zone a zone of counter-torque braking, said operation of said switching devices causing the counter-torque to be greatest when said controller is moved closest to said "off" position.

5. In a braking control system for a wound rotor induction hoisting motor, a movable controller including a plurality of switching devices, said controller being provided with an "off" position and a power lowering zone, some of said switching devices being operative when said controller is in the power lowering zone to connect said motor for power lowering, a manual means having two positions of movement, means responsive to movement of said manual means to one of said positions to render some of said switching devices operative to de-energize said motor, means responsive to movement of said manual means to the other of said positions to render some of said switching devices operative to connect said motor for hoisting, and means operable to render said switching devices operative in response to movement of said manual means only while said controller is in said power lowering zone.

6. A motor control system for hoists and the like subject to overhauling descending loads and driven by a polyphase wound rotor induction motor, a balanced secondary resistance adapted to be connected in a closed network with the secondary winding of said motor, means for controlling the direction and speed of said motor comprising a plurality of contactors and a master switch, said master switch having an "off" position, a hoisting position, and a plurality of lowering positions, a contact segment means on said master switch operable in the lowering positions for completing a circuit for energizing some of said contactors to connect the motor to a source of power for exerting a torque assisting the torque of the overhauling load, said contact segment means including means for concurrently partially completing another circuit, a manual switch means in said partially completed circuit operable to complete said circuit for causing some of said contactors to unbalance said secondary resistance and reverse said motor connections.

7. The combination with a control system for a polyphase wound rotor induction motor subject to overhauling loads and having a primary winding and a secondary winding and comprising a polyphase resistance network adapted to be connected to said secondary winding to form, when so connected, a closed polyphase network with said secondary winding, resistance adjusting means operable to balance and unbalance said closed network selectively, a master switch having a forward position and a reverse position, means operative while said master switch is in said forward position to connect said primary winding to a source of power for causing said motor to exert a torque assisting the torque of the overhauling load, and means operative while said master switch is in said reverse position to connect said primary winding to said source of power for causing said motor to exert a torque opposing the torque of the overhauling load, a control circuit, of manual means operable to affect the conductivity of said circuit to render said circuit operative, only when said master switch is in said forward position, to substantially concurrently reverse the connections between said primary winding and said source and to cause said resistance adjusting means to unbalance said network.

8. A combination in accordance with claim 7 characterized in that said manual means has two operative positions of movement and that means are provided responsive to movement of said manual means to one of said positions to affect the conductivity of said circuit to cause thereby de-energization of said motor.

9. A combination in accordance with claim 7 characterized in that said circuit is responsive to the manual means for de-energizing said motor and that said manual means has two positions of movement, one of which said positions causes the circuit to effect said reversal of the connection between said primary winding and the source, the other of which positions causes said circuit to effect said de-energization of the motor, and one of said two positions causes said circuit to effect said unbalance.

10. The combination with a control system for a polyphase wound rotor induction motor subject to overhauling loads and having a primary winding and a secondary winding and comprising a polyphase resistance network adapted to be connected to said secondary winding to form, when so connected, a closed polyphase network with said secondary winding, resistance adjusting means operable to balance and unbalance said closed network selectively, a master switch having a neutral position and a plurality of running positions, means operative while said master switch is in said running positions to connect said primary winding to a source of power for causing said motor to exert a torque assisting the torque of the overhauling load, reversing means to reverse the connection between said primary winding and the source, circuit control means including contact segments on said master switch operable as said master switch is moved further from said neutral position through said running positions to increase said assisting torque, of manual means operable for causing, only when said master switch is in said running positions, substantially concurrently unbalance of said closed network by said resistance adjusting means and reversal of the motor torque by said reversing means, and additional segments on said master switch rendered operable upon operation of said manual means to cause said circuit control means to decrease the reverse torque of the motor as said master switch is moved further from said neutral position through said running positions.

11. In a control system for hoisting mechanism, the combination with an induction motor comprising a stator and a rotor subject to an overhauling load, a resistor for varying the torque of said motor, a controller comprising switches at a series of stations for establishing circuits for controlling the direction and magnitude of the torque of said motor, hoisting switching means responsive to the controller at a first station for connecting the stator of the motor to a polyphase source of power so that the motor exerts a hoisting torque tending to raise the load, resistance adjusting means responsive to the controller for adjusting said resistor to vary said hoisting torque throughout a maximum range, braking switching means responsive to the controller at a second station for short-circuiting a portion of the stator and connecting a portion of the stator to a single phase source of power, and lowering switching means responsive to the controller at a third station for connecting the stator to a polyphase source of power so that the motor exerts a torque tending to lower the load, of manual means associated with said controller and operable for causing said resistance adjusting means to adjust said resistor when said controller is at said third station, and means operable in response to operation of said manual means for preventing operation of said lowering switching means and causing operation of said hoisting switching means so that the motor exerts a hoisting torque, adjustment of said resistor by operation of said manual means causing said hoisting torque to be variable throughout a minimum range.

BRUCE E. McARTHUR.
ASA H. MYLES.